US007739500B2

(12) United States Patent
Cameron et al.

(10) Patent No.: US 7,739,500 B2
(45) Date of Patent: Jun. 15, 2010

(54) METHOD AND SYSTEM FOR CONSISTENT RECOGNITION OF ONGOING DIGITAL RELATIONSHIPS

(75) Inventors: Kim Cameron, Bellevue, WA (US); Arun K. Nanda, Sammamish, WA (US); Andy Harjanto, Sammamish, WA (US); Stuart L. S. Kwan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1040 days.

(21) Appl. No.: 11/074,972

(22) Filed: Mar. 7, 2005

(65) Prior Publication Data

US 2006/0200667 A1 Sep. 7, 2006

(51) Int. Cl.
*H04L 9/00* (2006.01)
(52) U.S. Cl. .................. 713/168; 713/150; 713/155; 713/156; 713/157; 713/158; 713/159; 713/161
(58) Field of Classification Search .................. 713/150, 713/155–159, 161, 168; 380/229, 232, 247–250, 380/258, 277; 705/67, 51
See application file for complete search history.

(56) References Cited

U.S. PATENT DOCUMENTS

| | | | |
|---|---|---|---|
| 6,853,988 | B1 | 2/2005 | Dickinson et al. |
| 7,373,505 | B2 | 5/2008 | Seltzer et al. |
| 7,555,784 | B2 | 6/2009 | Cameron et al. |
| 7,624,110 | B2 | 11/2009 | Alagna et al. |
| 2003/0081785 | A1* | 5/2003 | Boneh et al. ............... 380/277 |
| 2005/0149442 | A1* | 7/2005 | Adams et al. ................ 705/51 |
| 2006/0198517 | A1 | 9/2006 | Cameron et al. |

FOREIGN PATENT DOCUMENTS

EP 1478121 A * 11/2004
WO WO 2005/098630 10/2005

OTHER PUBLICATIONS

Menezes A et al., "Handbook of Applied Cryptography, Identification and Entity Authentication". Handbook of Appliend Cryptography, CRC Press Series on Discrete Mathematics and Its Applications, Boca Raton, FL, CRC Press, US, 1997, pp. 385-424, XP002262234, ISBN: 0-8493-823-7.*

(Continued)

*Primary Examiner*—Carl Colin
*Assistant Examiner*—Hee Song
(74) *Attorney, Agent, or Firm*—Merchant & Gould P.C.

(57) ABSTRACT

Exemplary embodiments disclosed herein may include a method and system for creating an attendance marker and establishing consistent recognition of an ongoing digital relationship, including receiving an identity key about a server, creating an attendance marker, associating the attendance marker with the server. Other embodiments relate to systems and methods for recognizing a server, website, and/or other system for a client, such as a computer system for a user. Such authentication involves receiving an identity key about a web server or other system, creating an attendance marker, associating the attendance marker with the server, requesting an attendance marker associated with a server, and recognizing the server based at least in part on the attendance marker.

15 Claims, 5 Drawing Sheets

OTHER PUBLICATIONS

Jon Callas, "Identity-Based Encryption with Conventional Public-Key Infrastructure", 14 pages, Feb. 18, 2005, http://middleware.internet2.edu/pki05/proceedings/callas-conventional_ibe.pdf.*

Extended European Search Report for EP 06 10 1313 dated Jun. 26, 2006 (2 pages).

Extended European Search Report for EP 06 110 218.2 dated Jun. 28, 2006 (2 pages).

Final Rejection for U.S. Appl. No. 11/074,885 dated Jun. 23, 2009 (15 pages).

Non-Final Rejection for U.S. Appl. No. 11/073,404 dated Oct. 2, 2008 (7 pages).

Non-Final Rejection for U.S. Appl. No. 11/074,885 dated Nov. 28, 2008 (14 pages).

Non-Final Rejection for U.S. Appl. No. 11/074,885 dated May 2, 2008 (7 pages).

Official Communication, European Patent Office, dated Apr. 17, 2007 regarding EP 06 10 1313 (1 page).

Official Communication, European Patent Office, dated Mar. 12, 2007 regarding App. No. EP 06 110 218.2 (1 page).

Official Communication, European Patent Office, dated Dec. 13, 2007 regarding App. No. EP 06 110 218.2 (1 page).

Official Communication, European Patent Office, dated Dec. 17, 2008, regarding App. No. EP 06 110 218.2—2212 (1 page).

Opinion Related to the Extended European Search Report for EP 06 10 1313 dated Jun. 26, 2006 (4 pages).

Zhang, et al. "Anonymous public-key certificates for anonymous and fair document exchange," Dec. 2000, pp. 345-350 (6 pages).

* cited by examiner

METHOD AND SYSTEM FOR CONSISTENT RECOGNITION OF ONGOING DIGITAL RELATIONSHIPS

TECHNICAL FIELD

The invention relates generally to the field of computer and network security. More particularly, the invention relates to consistent recognition of identity between computer systems and users.

BACKGROUND

Many transactions involving money occur everyday utilizing the Internet and Internet technologies. Furthermore, many dishonest people are attracted to intercepting some of these transactions and stealing money. One method for intercepting involves the use of imitation websites that are identical, or nearly identical, in appearance to legitimate websites. As a result, innocent, unsuspecting users are requested to reveal personal information, such as name, address, social security number, credit card numbers, etc., that allow the imitators (i.e. those that set up the imitation or rogue sites) to steal the identity of the user, and/or money. Such theft is a growing problem.

More and more transactions may take place in the future. As users complete more and more transactions online, their comfort level may increase. This may increase the confidence of the user that the transactions are safe and secure.

Additionally, these transactions may take place with many different websites and with many different user interfaces, making it difficult for a user to determine if the website is legitimate and not an imposter-created website.

SUMMARY

Exemplary embodiments disclosed herein relate to a method and system for alleviating the disadvantages noted above, as well as others. Exemplary embodiments disclosed herein may include a method and system for creating an attendance marker and establishing consistent recognition of an ongoing digital relationship, including receiving an identity key about a server, by an originating system, creating an attendance marker, and storing the attendance marker at the server.

Other embodiments relate to systems and methods for recognizing a server, website, and/or other system for a client, such as a system for a user. Such authentication involves receiving an identity key about a web server or other system, creating an attendance marker, and associating the attendance marker with the server.

In accordance with still other aspects, exemplary embodiments relate to a method of recognizing a system, which includes requesting an attendance marker associated with a server, and recognizing the server based at least in part on the attendance marker.

Exemplary embodiments may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present disclosure can be obtained by reference to the accompanying drawings, which are briefly summarized below, and to the following detailed description of exemplary embodiments, and to the appended claims.

DETAILED DESCRIPTION

Figure 1:
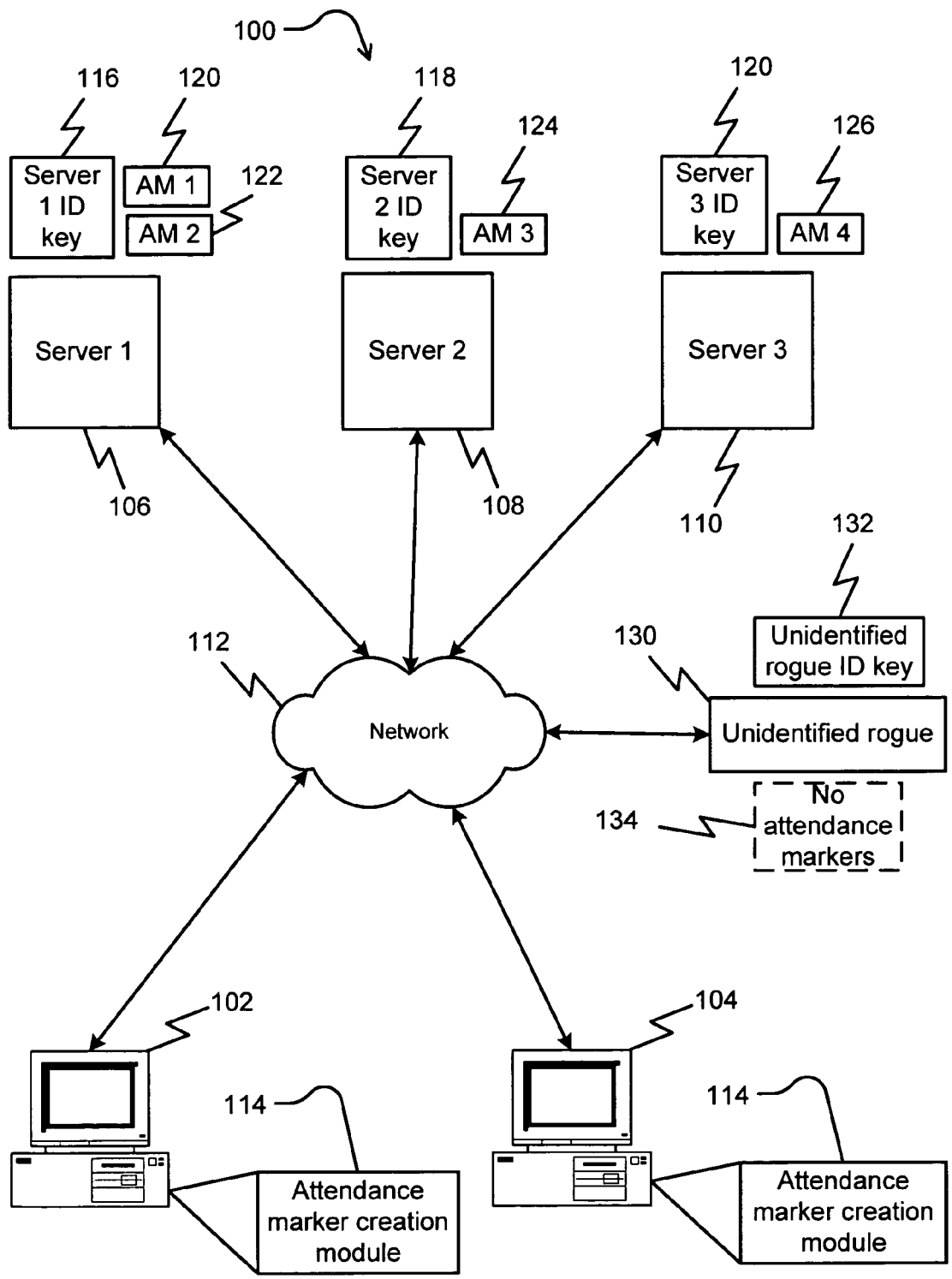
FIG. 1 is a block diagram of a system for creating attendance marker(s), and recognition of an ongoing digital relationship according to an exemplary embodiment.

FIG. 1 is a block diagram of a system, which may be utilized for creating attendance markers, authenticating identification, and recognition of ongoing digital relationships according to an exemplary embodiment, generally at 100. In this embodiment, system 100 includes clients 102, 104. Clients 102, 104 are connected to a network 112, which, in turn is connected to Server 1 106, Server 2 108, and Server 3 110. Network 112 may be the Internet, or other communication channel, which may be utilized to communicate between clients and servers. It will be appreciated that many different configurations for network 112 may be utilized. Server 1 106 has an associated Server 1 identity key 116. ID key 116 may be provided by a third party, and/or in another certificate, as desired.

In this embodiment, client 102 includes an attendance marker creation module 114. Attendance marker creation module 114 is capable of creating an attendance marker. Client 102 may request the identification key 116 for server 1 106. Client 102 may then create a master key and utilize identity key 116, the master key, and a constant to create an attendance marker 1 120 and a corresponding attendance marker identifier, utilizing attendance marker creation module 114 such that it is virtually impossible for a third party to intercept and decipher the content of the attendance marker without possession of the master key. Attendance marker 120 may then be stored on, or associated with, server 1 106 such that when client 102 again visits server 1 106, and/or a user of client 102 visits server 1 106 again, it may request attendance marker 120 by presenting the attendance marker identifier to the server such that it may determine if it has previously accessed server 1 106. This embodiment may also be utilized to determine the authenticity of server 1 106 and/or an associated web site.

It will be appreciated that although attendance marker has been described as being stored at server 1 106, attendance marker 120 may also be stored at a remote location and associated with server 1 106. This remote location may be a registering service and/or other third party site that may be configured for this purpose.

Similarly, a different client 104 may also access server 1 106 and request server 1 ID key 116. Similarly, it may also create an attendance marker 2 122 and a corresponding attendance marker identifier utilizing ID key 116, a master key, and a constant. Client 2 104 may then store attendance marker 2 122 and the corresponding attendance marker identifier on server 1 106.

Attendance marker 2 122 and the corresponding attendance marker identifier may be created by an attendance marker creation module 114 associated with client 104. Similarly to the method described previously, when client 104 subsequently accesses server 1 106 it may request attendance marker 2 122 by presenting the attendance marker identifier to the server such that it may determine if it has previously accessed server 1 106 and/or provided some identity information to server 1 106.

When storing or requesting the attendance marker, either party may require further assurances of the others' identity. This may be in the form of a challenge or other request that would require the use of the attendance marker, or the use of the information utilized to create the attendance marker, such that only the parties would be able to understand and/or respond appropriately to the request. With this configuration, if an unidentified rogue 130 gets hold of the attendance marker or the attendance marker identifier, no identity or other information may be disclosed or discernable to the unidentified rogue.

Furthermore, client 1 102 may access server 2 108 and request server 2 ID key 118. After receiving ID key 118 of server 108, client 102 may then utilize ID key 118, a master key, and a constant to create attendance marker 3 124 and a corresponding attendance marker identifier. The creating of attendance marker 3 124 may utilize an encryption function, such as but not limited to a hash function, such that it would be virtually impossible for a third party to intercept and decrypt attendance marker 103.

Client 102 may then request attendance marker 3 124 when accessing server 2 108 again by presenting the attendance marker identifier to the server. Because attendance markers are encrypted, only a user with the master key used to create the attendance marker may decrypt it, because the particular information that is contained within the encryption function is only known to the user who created the attendance marker. Therefore, client 102 may store different attendance markers at each and every web site and/or server visited, and may be able to retrieve the attendance marker to determine if the server has been previously accessed. Furthermore, this attendance marker may be utilized to authenticate a server and/or web site as only the particular client or user that stored the attendance marker at the server will be able to decrypt it to determine if the server has been previously accessed.

Similarly, client 104 may access server 3 and request server 3 identification key 120. Client 104, using its attendance marker creation module 114, may then utilize a random master key, an optional constant along with server 3 ID key 120 to create attendance marker 4 126 and a corresponding attendance marker identifier which may then be stored at, or associated with, server 3 120. Because attendance marker 4 126 is encrypted, only client 104 will be able to decrypt it and to compare it to the information utilized to create attendance marker 4 126. Therefore, attendance marker 4 126 may be utilized by client 104 to determine if client 104 has previously accessed server 3 120. This may provide evidence of an ongoing digital relationship. Furthermore, this configuration may be utilized to authenticate a website and/or server, as only a previously visited server would have an associated attendance marker from a particular client.

As described above, dishonest people may try to trick a client, and/or a user of a client, into providing personal information. Unidentified rogue 130 may try to copy or look like a legitimate server and/or web site to obtain identity and/or other information from a client 102, 104. With the exemplary embodiments disclosed herein, when the client requests an identity key, unidentified rogue ID key 132 will be provided to the client and, thus, the client may discern that it is not a server previously visited. Furthermore, when the client requests an attendance marker, unidentified rogue will have no verifiable attendance marker(s) 134 as the client and/or user has not previously accessed the website of the unidentified rogue. Either of these scenarios would alert a user of a client 102, 104 that the web site and/or server is not to be trusted, and the user should be wary of disclosing identity or other information.

Similarly, if unidentified rogue 130 tries to access any of the servers to obtain identity information of a client, the unidentified rogue 130 may request an attendance marker, but would not be able to decrypt it or access any information about any particular user and/or client that has accessed that server.

With this exemplary embodiment a user and/or client may have additional levels of security that may inhibit unidentified rogues from obtaining personal information by spoofing a web site. Furthermore, this may also inhibit the "man in the middle" interception of information to provide further security.

Since the attendance markers are stored at the servers and/or web sites, a user may take their master key to many different clients and access web sites and be somewhat secure in the fact that they are dealing with an authentic web site. Again, they may utilize the server identification key along with their master key(s) to decrypt the attendance marker saved at the web site to determine if they have previously visited the server and/or web site. This may also be attractive to users who use multiple machines at home, work, the library, etc. that they may have some level of comfort in dealing with web sites. As noted above, this attendance marker may also be utilized to authenticate the web site to provide further security.

Figure 2:
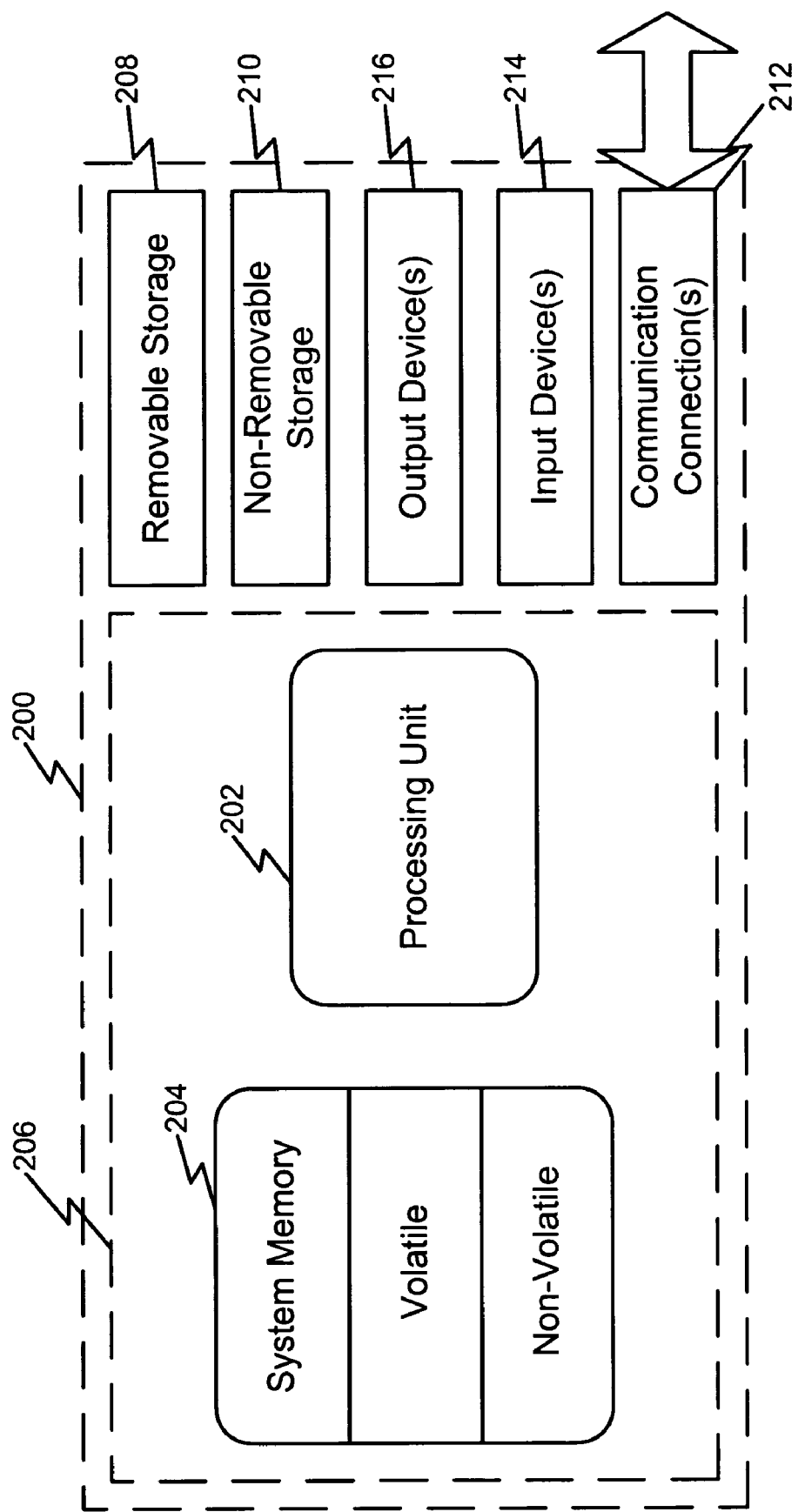
FIG. 2 illustrates an example of a suitable computing system environment on which exemplary embodiments may be implemented.

FIG. 2 illustrates an example of a suitable computing system environment on which exemplary embodiments may be implemented. This system 200 is representative of one that may be used to serve as a client and/or a server as described above. In its most basic configuration, system 200 may include at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 generally at 206. Additionally, system 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media may include volatile and non-volatile, removable and non-removable media implemented in any method or technology for storage of information such as computer readable instructions, data structures, program modules or other data. Memory 204, removable storage 208 and non-removable storage 210 are all examples of computer storage media. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200, or combinations thereof. Any such computer storage media may be part of system 200.

System 200 may also contain communications connection(s) 212 that allow the system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

System 200 may also have input device(s) 214 such as keyboard, mouse, pen, voice input device, touch input device, etc. Output device(s) 216 such as a display, speakers, printer, etc. may also be included. All these devices may be well known in the art and need not be discussed at length here.

A computing device, such as system 200, may include at least some form of computer-readable media. Computer readable media may be any available media that can be accessed by the system 200. By way of example, and not limitation, computer-readable media may comprise computer storage media and communication media.

Figure 3:
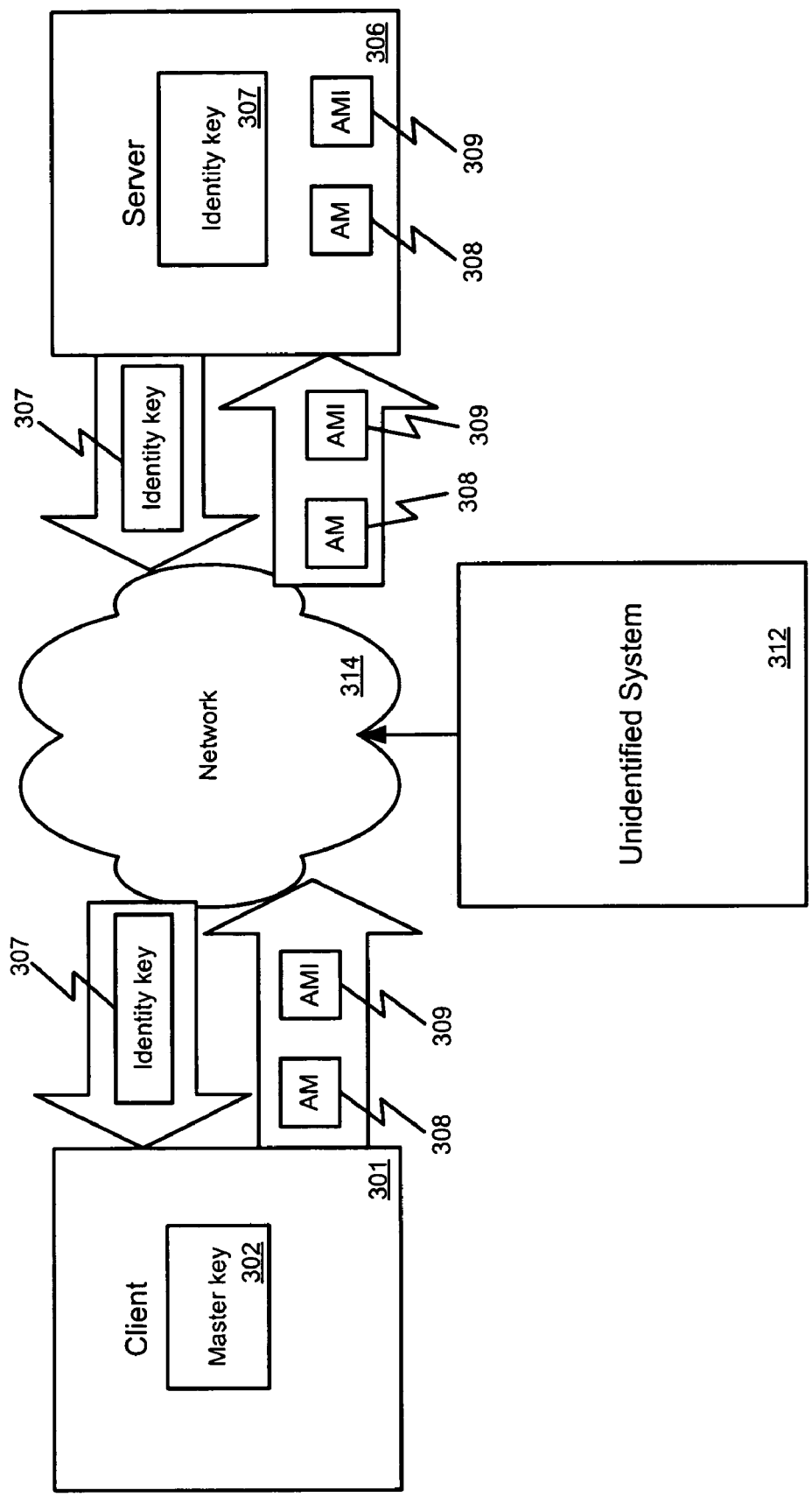
FIG. 3 is a block diagram of a system for creating attendance marker(s) and authenticating a system according to an exemplary embodiment.

FIG. 3 illustrates, at a conceptual level, a system for creation and utilization of attendance markers according to an exemplary embodiment. This exemplary embodiment illustrates a client 301 and a server 306 connected via a network 314 or other channel. As will become apparent, most devices can function as both a client 301 and a server 306 at various times. However, for simplicity, these functions are illustrated separately here. Additionally, network 314 may be almost any type of network, such as the Internet or some other type of channel suitable for establishing communication between the client 301 and the server 306.

Client 301 may be a computer or other system, such as a personal PC accessing a website via the Internet. It will be appreciated, however, that other devices and/or configurations may be utilized without straying from the concepts disclosed herein. Similarly, the server 306 may be a host for a website, or other server, or other device or configuration.

The server 306 has an associated identity key 307. Identity key 307 has information about the server. In an embodiment, the information relates to the URL, name of the principal owning or operating the system, and/or other "identity" information. When accessing the server 306, the client 301 may request an identity key 307, and/or the identity key 307 may be provided to the client 301 by the server or other entity. Although identity key 307 is shown as residing or originating from server 306, it will be appreciated that identity key may reside or originate from another source, including but not limited to, a verification entity, among others.

In another exemplary embodiment, client 301 receives a certificate containing information about server 306. The information contained within the certificate includes identity key 307, or other identity information. Client 301 parses the certificate to access the identity key 307. As described above the certificate may originate from a verification entity, or other entity.

Client 301 may then create a master key 302. Master key 302 may be a randomly generated number and/or a variety of different types of information including, but not limited to, a time stamp, identity information and the like, or other information. Client 301 may then utilize an encryption function of the combination of the master key 302 and the identity key 307, and a constant to create an attendance marker (AM) 308. This attendance marker 308 may be created for each server 306 and/or server and/or website visited.

Once created, the attendance marker 308 is stored on the web server, or in association with the website for which that attendance marker has been created. As a result, the user can revisit the server and/or site, and quickly verify/recognize the site through the analysis of the attendance marker. Furthermore, each system visited may be given a unique attendance marker such that the operators of the different systems may not compare markers to collaborate and share information about the client or a user.

The encryption may be an AES 256 hash function. However, it will be appreciated that other encryption algorithms, functions, and configurations may be utilized without straying from the concepts disclosed herein.

The attendance marker 308 may then be sent to, and stored on, the server 306. When the client 301 accesses the server 306 again, the client 301 may request and/or receive the identity key 307, and/or attendance marker 308. The client 301 may then decrypt attendance marker 308, and/or compare attendance marker 308 to the original factors and/or recreated attendance marker 308, by utilizing the original identity key 307 and master key 302, to determine if the client 301 has previously accessed server 306.

Client 301 may also create an attendance marker identifier (AMI) 309 and associate and/or store the attendance marker identifier 309 with the attendance marker 308. When subsequently accessing the server 306 again, the client 301 may provide the attendance marker identifier 309 corresponding to the attendance marker 308 to obtain the attendance marker 308.

Furthermore, either the client or the server may require further assurances of the other's identity. This may be accomplished via the use of a challenge and/or requirement that may only be answered or fulfilled with the use of the attendance marker and/or the original information utilized to create the attendance marker. In this manner, an unidentified rogue may not obtain information or services by surreptitiously acquiring and present either the attendance marker identifier, or the attendance marker.

This information may also be utilized to determine the authenticity of the server 306, such that the client 301 and the user of the client 301 may be more confident that the server 306 and/or associated websites and systems are authentic and/or legitimate. Among other benefits, this may reduce fraud, and increase user confidence before the user discloses identity information or other sensitive information to the server 306. This authentication may provide consistent recognition of an ongoing digital relationship.

If the client 301 receives anything other than an expected attendance marker 308, this may indicate that the client 301 has not previously accessed this server 306. This may also indicate that the legitimate site is being imitated or that the server 306 has lost the key, among other scenarios. This may indicate to the user of the client 301 that the server 306 is not trustworthy, and that the user should disconnect from the server 306, or proceed with caution and/or not divulge any sensitive, confidential, and/or identity information.

A further benefit of the embodiment shown in FIG. 3 is that a user may access a website and/or a server 306 from many different clients with the original master key, and still have a level of assurance that the website is legitimate. A user may be able to authenticate a system by retrieving the attendance marker 308 and identity key 307, and decrypt the attendance marker 308 using a decryption key derived from the master key, or otherwise determine if the attendance marker was a marker previously stored on the server by the user.

Figure 4:
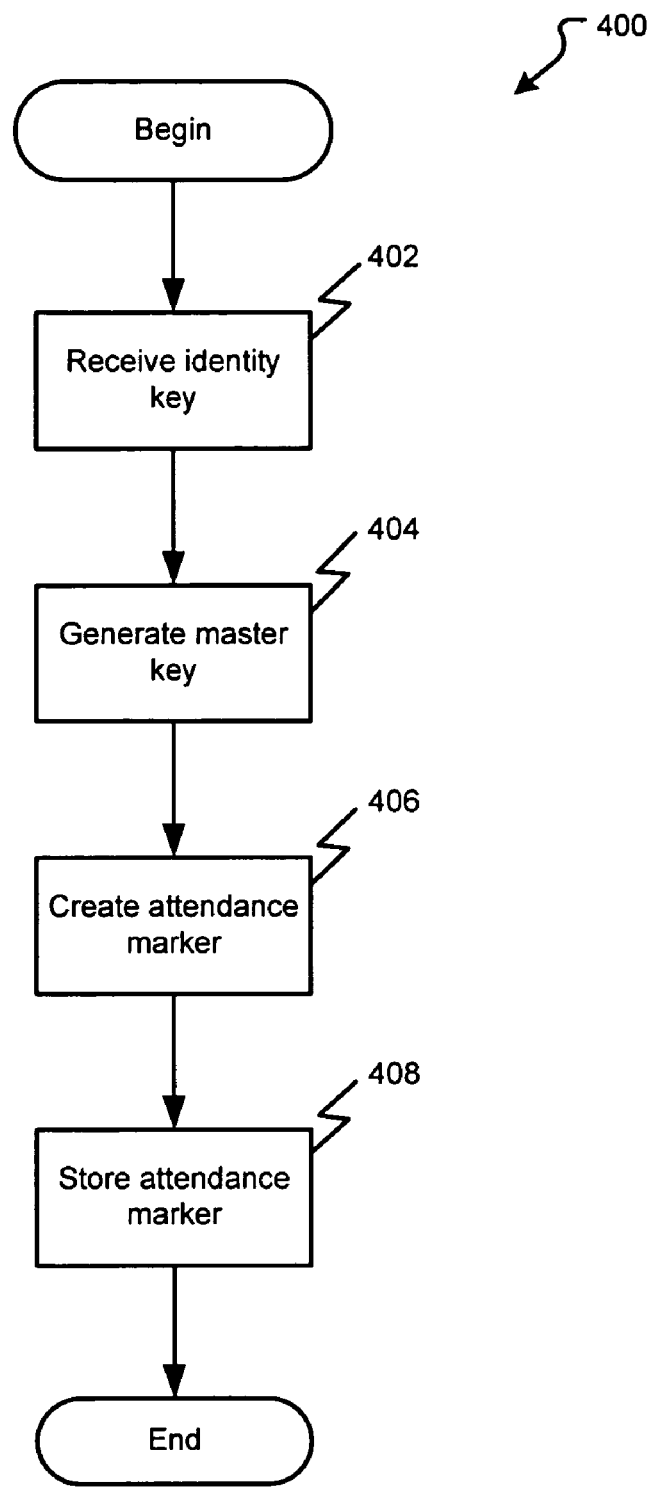
FIG. 4 is a flow diagram illustrating operational characteristics involved in creating an attendance marker and recognizing an ongoing digital relationship according to an exemplary embodiment.

FIG. 4 is a flowchart illustrating a method for creating an attendance marker according to an exemplary embodiment, generally at 400. Method 400 includes receive operation 402. Receive operation 402 includes receiving an identity key from a server or other entity. The identity key may include identity information about the server, including, but not limited to a unique URL, a principal owning the system, and/or other identification information. Furthermore, the identity key may be a portion of a certificate, such as a security certificate, or other certificate, that is associated with the server. The identity key may be parsed out of the certificate. Control then passes to generate operation 404.

Generate operation 404 may include generating a master key. The master key may be a random number, identity information, or other unique information and/or combinations thereof. The master key may also have been previously generated and reused for different applications. It will be appreciated that the master key should be stored in a very secure place that will not allow an unauthorized person or entity to break in and view and/or steal the information. Control then passes to create operation 406.

Create operation 406 may include creating an attendance marker as a function of the identity key, the master key, and optionally a constant. It will be appreciated that other information and/or combinations of information may be utilized without straying from the concepts disclosed herein. The function may be a one-way encryption of the above information, such that the original information may not be determined from the resultant attendance marker. This function may be a hash function or other encryption function or algorithm and/or combinations thereof. Create operation may also include creating an attendance marker identifier and associate and/or store the attendance marker identifier with the attendance marker. When subsequently accessing the server again, the client may provide the attendance marker identifier corresponding to the attendance marker to obtain the attendance marker. Control then passes to store operation 408.

Store operation 408 may include storing an attendance marker at the server and/or associating the marker with the server or web site. The attendance marker is associated with the server such that it may be accessed by the client when the client accesses the server again. Furthermore, it may be accessed by the user from another system, such that a user may authenticate or recognize a system or website from many different devices or systems. Store operation 408 may also include associating and/or storing the attendance marker identifier at the server or a third party site. In this manner, the client may determine if the server has been previously accessed to provide recognition of an ongoing digital relationship. Furthermore, this information may be utilized to determine the authenticity and/or legitimacy of the server.

Figure 5:
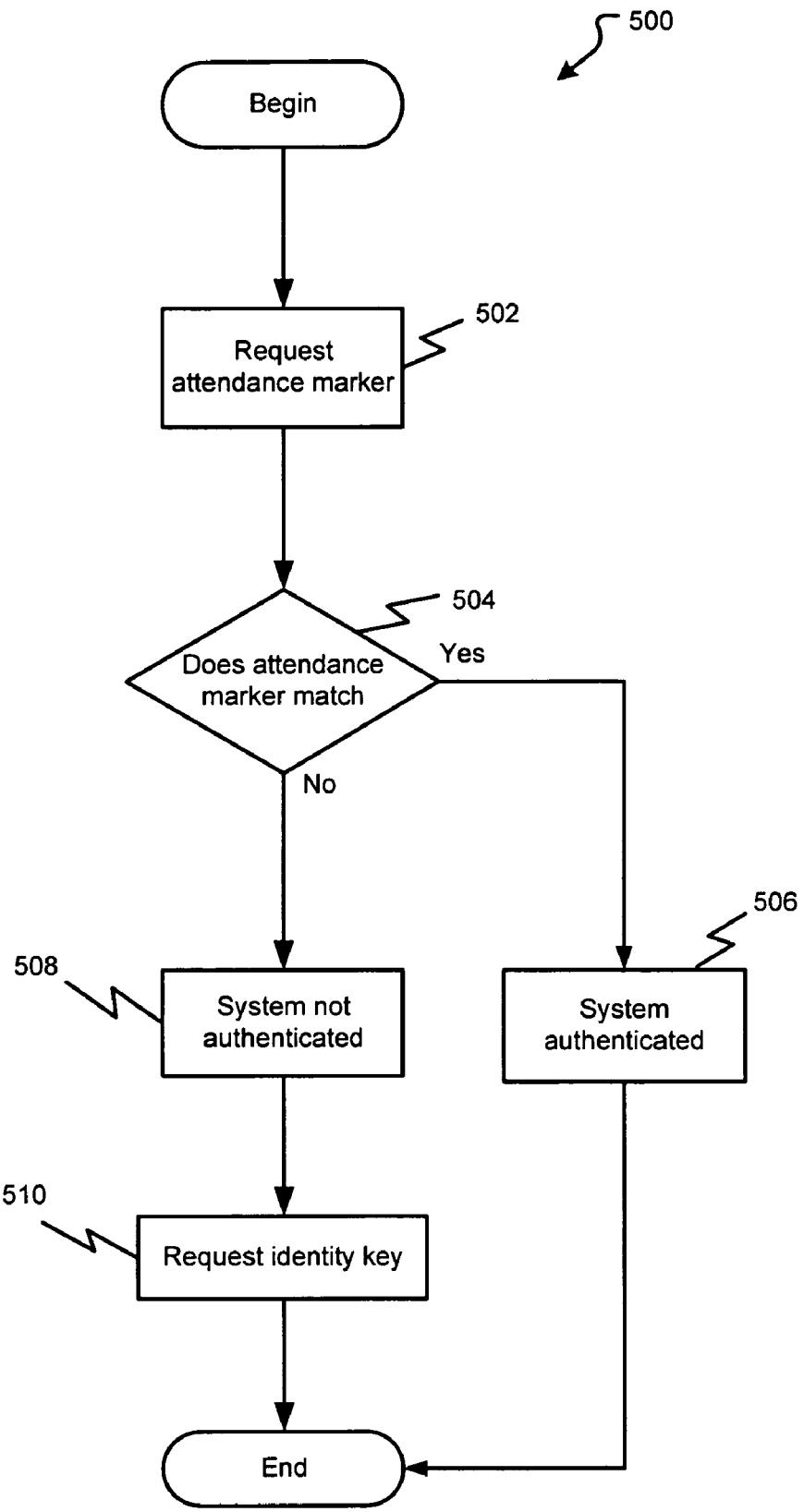
FIG. 5 is a flow diagram illustrating operational characteristics involved in authenticating a system according to an exemplary embodiment.

FIG. 5 is a flowchart illustrating a method for determining authenticity and recognition of an ongoing digital relationship according to an exemplary embodiment, generally at 500. According to aspects of method 500, processing begins with request operation 502 includes requesting by the client of a previously created and stored attendance marker from the server over a channel as described above. The receive operation may process the incoming signal from the server to recover the attendance marker from the incoming signal. The client may also provide the attendance marker identifier corresponding to the attendance marker to obtain the attendance marker. Control then passes to query operation 504.

Query operation 504 includes determining whether the attendance marker received matches an attendance marker saved and/or recreated and/or decrypted and/or previously stored by the client. Since the client may have saved a corresponding attendance marker, the attendance markers may be compared to determine if the server has been previously accessed. Furthermore, the client may utilize the identity key and the original master key to determine if the server has been previously accessed. If the attendance markers match, control passes to system authenticated 506. This indicates that the client has previously accessed the server and stored an attendance marker with the server.

If the attendance markers do not match, or an attendance marker is not received, control passes to the request function 510. Request function 510 may include requesting an identity key from the server. If a client has previously accessed a server, or website, and this function is initiated, the user may have some indication that the website is not authentic. This may also indicate to the user that another entity is attempting to obtain identity information from the principal. This may also indicate that the server has lost the attendance marker, or the server has been tampered with. With any of these scenarios, the user of the client may have an indication that this system is not to be trusted and caution should be used when any information is disclosed to the server or web site.

The logical operations of the various embodiments of the exemplary embodiments may be implemented (1) as a sequence of computer implemented acts or program modules running on a computing system and/or (2) as interconnected machine logic circuits or circuit modules within the computing system, or combinations thereof. The implementation is a matter of choice dependent on the performance requirements of the computing system implementing the invention. Accordingly, the logical operations making up the embodiments of the exemplary embodiments described herein are referred to variously as operations, structural devices, acts or modules. It will be recognized by one skilled in the art that these operations, structural devices, acts and modules may be implemented in software, in firmware, in special purpose digital logic, and/or any combination thereof without deviating from the spirit and scope of the present disclosure as recited within the claims attached hereto.

Although the exemplary embodiments have been described in language specific to computer structural features, methodological acts and by computer readable media, it is to be understood that the exemplary embodiments defined in the appended claims is not necessarily limited to the specific structures, acts or media described. As an example, different formats other than XML may be used to encode identification information. Therefore, the specific structural features, acts and mediums are disclosed as exemplary embodiments implementing the claimed invention.

The various embodiments described above are provided by way of illustration only and should not be construed to limit this disclosure. Those skilled in the art will readily recognize various modifications and changes that may be made to the present disclosure without following the exemplary embodiments and applications illustrated and described herein, and without departing from the true spirit and scope of the present disclosure, which is set forth in the following claims.

What is claimed is:

1. A computer-implemented method of recognition of an ongoing digital relationship, comprising:

receiving, at a client computing device, an identity key associated with a server, wherein the identity key includes server specific information about the server;

creating a random master key;

creating an attendance marker and an attendance marker identifier, wherein the attendance marker is created using the identity key, the master key, and a constant, and wherein creating an attendance marker comprises encrypting identifying information using an encryption key derived from the identity key and the master key;

associating the attendance marker with the server;

sending the attendance marker to the server for storing the attendance marker on the server in association with a website for which the attendance marker has been created;

requesting the previously stored attendance marker from the server, wherein the attendance marker indicates that the client computing device has previously accessed the server; and authenticating the server based at least in part on the attendance marker, wherein the authenticating comprises decrypting the attendance marker.

2. The computer-implemented method of claim 1, wherein requesting the attendance marker comprises providing the attendance marker identifier corresponding to the attendance marker.

3. The computer-implemented method of claim 1, wherein the attendance marker identifier comprises a hash of the identity key, master key, and a constant.

4. The computer-implemented method of claim 1, further comprising receiving a certificate comprising the identity key.

5. The computer-implemented method of claim 4, further comprising parsing the identity key from the certificate.

6. The computer-implemented method of claim 1, wherein the encrypting comprises a hash function.

7. The computer-implemented method of claim 1, further comprising requesting further assurances related to the attendance marker.

8. The computer-implemented method of claim 1, wherein the authenticating comprises determining if the decrypted attendance marker matches an original attendance marker.

9. A system to send an identity information document, the system comprising:
  a processor;
  a communication channel connected with the processor; and
  a memory coupled with and readable by the processor, the memory containing a series of instructions that, when executed by the processor, cause the processor to:
    receive an identity key associated with a server, wherein the identity key includes server specific information about the server,
    create a random master key,
    create an attendance marker, wherein the attendance marker is created using the identity key, the master key, and a constant, associating the attendance marker with the server, wherein the attendance marker indicates that a client has previously accessed the server, wherein creation of an attendance marker comprises encrypting identifying information using an encryption key derived from the identity key and the master key,
    send the attendance marker to the server for storing the attendance marker on the server in association with a website for which the attendance marker has been created,
    request the stored attendance marker-from the server, and
    recognize the server based at least in part on the stored attendance marker.

10. The system of claim 9, wherein the memory further comprises instructions that cause the processor to create an attendance marker identifier corresponding to the attendance marker.

11. The system of claim 10, wherein requesting the attendance marker comprises providing the attendance marker identifier corresponding to the attendance marker.

12. The system of claim 10, wherein the encrypting comprises a hash function.

13. The system of claim 9, wherein the memory further comprises instructions that cause the processor to request further assurances related to the attendance marker.

14. The system of claim 9, further comprising:
  responsive to recognizing the server, allowing further interaction between the client and the server, and
  responsive to not recognizing the server, requesting a certificate about the server.

15. A computer storage media encoding instructions for executing a computer implemented method for recognition of an ongoing digital relationship, the method comprising:
  receiving an identity key associated with a server, wherein the identity key includes server specific information about the server;
  creating a random master key;
  creating an attendance marker and an attendance marker identifier, wherein the attendance marker and attendance marker identifier are created using the identity key, the master key, and a constant, and wherein the identity key, master key, and constant may not be determined from the resultant attendance marker, and wherein creating an attendance marker comprises encrypting identifying information using an encryption key derived from the identity key and the master key;
  associating the attendance marker with the server, wherein the attendance marker indicates that a client has previously accessed the server;
  sending the attendance marker to the server for storing the attendance marker on the server in association with a website for which the attendance marker has been created;
  presenting the attendance marker identifier to the server;
  in response to presenting the attendance marker identifier, receiving the previously stored attendance marker from the server; and
  determining whether the received attendance marker matches the created attendance marker.

* * * * *